(12) United States Patent
Yoshioka

(10) Patent No.: US 9,942,441 B2
(45) Date of Patent: Apr. 10, 2018

(54) INFORMATION PROCESSING APPARATUS CONFIGURED TO PREDICT A SIZE OF A STORAGE-USE REGION, METHOD, IMAGE PROCESSING SYSTEM, AND STORAGE MEDIUM

(71) Applicant: Tatsuroh Yoshioka, Kanagawa (JP)

(72) Inventor: Tatsuroh Yoshioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/249,917

(22) Filed: Aug. 29, 2016

(65) Prior Publication Data

US 2017/0070643 A1 Mar. 9, 2017

(30) Foreign Application Priority Data

Sep. 9, 2015 (JP) .................. 2015-177609
Jul. 19, 2016 (JP) .................. 2016-141263

(51) Int. Cl.
*H04N 1/387* (2006.01)
*H04N 1/00* (2006.01)
(Continued)

(52) U.S. Cl.
CPC ......... *H04N 1/3876* (2013.01); *G06F 3/0608* (2013.01); *G06F 3/122* (2013.01);
(Continued)

(58) Field of Classification Search
CPC ....... H04N 1/00127; H04N 1/00148–1/00159; H04N 1/00766; H04N 1/21–1/2116; H04N 1/2129; H04N 1/2137–1/2158; H04N 1/2166–1/2195; H04N 1/32358–1/32491; H04N 1/33376; H04N 1/387–1/3876;
(Continued)

(56) References Cited

U.S. PATENT DOCUMENTS 5,357,348 A * 10/1994 Moro ................ H04N 1/00681
358/450
5,526,128 A * 6/1996 Fujiki .................... G06K 15/00
345/634

(Continued)

FOREIGN PATENT DOCUMENTS

JP 2003067243 A * 3/2003
JP 2003-122521 4/2003

(Continued)

*Primary Examiner* — Scott A Rogers
(74) *Attorney, Agent, or Firm* — Harness, Dickey & Pierce, P.L.C.

(57) ABSTRACT

An information processing apparatus includes a memory, and circuitry. The circuitry acquires a plurality of images divided from original image data, the plurality of images including at least a first image data and a second image data, predicts a size of a storage-use region in the memory, the storage-use area to be used for storing the plurality of image data to be merged based on image information of the acquired first image data, secures the predicted size of the storage-use region in the memory, merges the plurality of image data in the storage-use region secured in the memory based on image information of the acquired first image data, and stores the merged plurality of image data in the storage-use region secured in the memory.

17 Claims, 9 Drawing Sheets

(51) Int. Cl.
  *H04N 1/21* (2006.01)
  *G06K 15/02* (2006.01)
  *G06F 3/12* (2006.01)
  *G06F 3/06* (2006.01)

(52) U.S. Cl.
  CPC .......... *G06F 3/1229* (2013.01); *G06F 3/1242* (2013.01); *G06K 15/1861* (2013.01); *G06K 15/1886* (2013.01); *G06K 15/1889* (2013.01); *H04N 1/00148* (2013.01); *H04N 1/2104* (2013.01); *H04N 1/2129* (2013.01); *H04N 2201/0039* (2013.01); *H04N 2201/0081* (2013.01); *H04N 2201/0094* (2013.01)

(58) Field of Classification Search
  CPC .................. G06K 15/1861–15/1865; G06K 15/1886–15/1889; G06F 3/0601–3/0667; G06F 3/122

See application file for complete search history.

(56) References Cited

U.S. PATENT DOCUMENTS

| | | | |
|---|---|---|---|
| 6,870,634 B1* | 3/2005 | Morikawa | H04N 1/00681 358/1.15 |
| 7,486,843 B2* | 2/2009 | Ohbuchi | G06K 9/32 345/660 |
| 8,325,382 B2* | 12/2012 | Maeno | H04N 1/00129 358/1.15 |
| 8,520,250 B2* | 8/2013 | Imaizumi | H04N 1/2166 358/1.13 |
| 9,191,564 B2* | 11/2015 | Li | H04N 1/2112 |
| 9,641,718 B2* | 5/2017 | Goto | H04N 1/2104 |
| 2006/0092470 A1* | 5/2006 | Yamada | G06K 15/00 358/1.16 |
| 2008/0222181 A1 | 9/2008 | Yoshioka | |
| 2012/0243034 A1* | 9/2012 | Hirai | G06F 3/1204 358/1.15 |

FOREIGN PATENT DOCUMENTS

| | | | |
|---|---|---|---|
| JP | 2003-308189 | 10/2003 | |
| JP | 2014053822 A | * 3/2014 | ......... G06K 15/1861 |

* cited by examiner

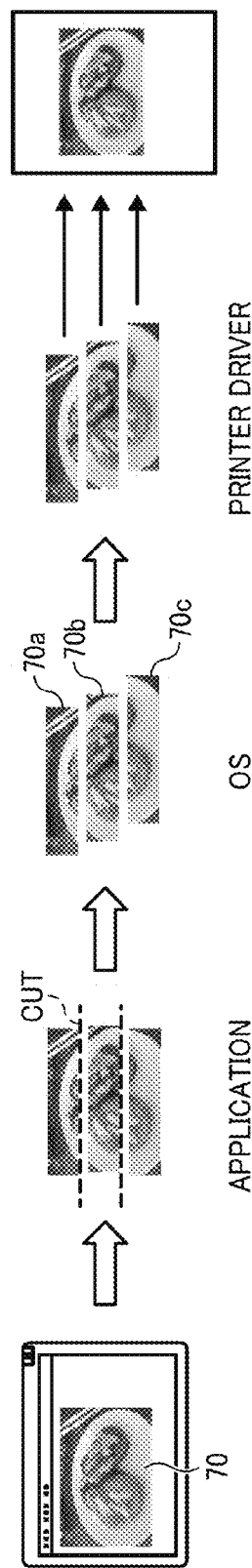
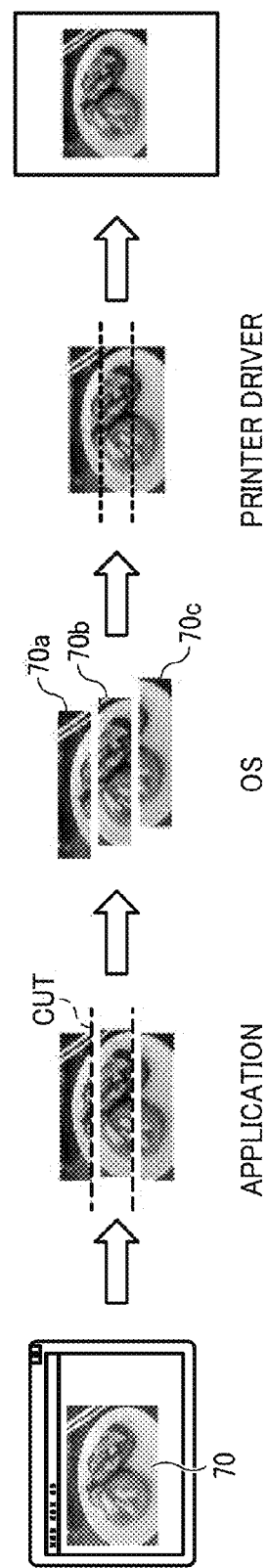

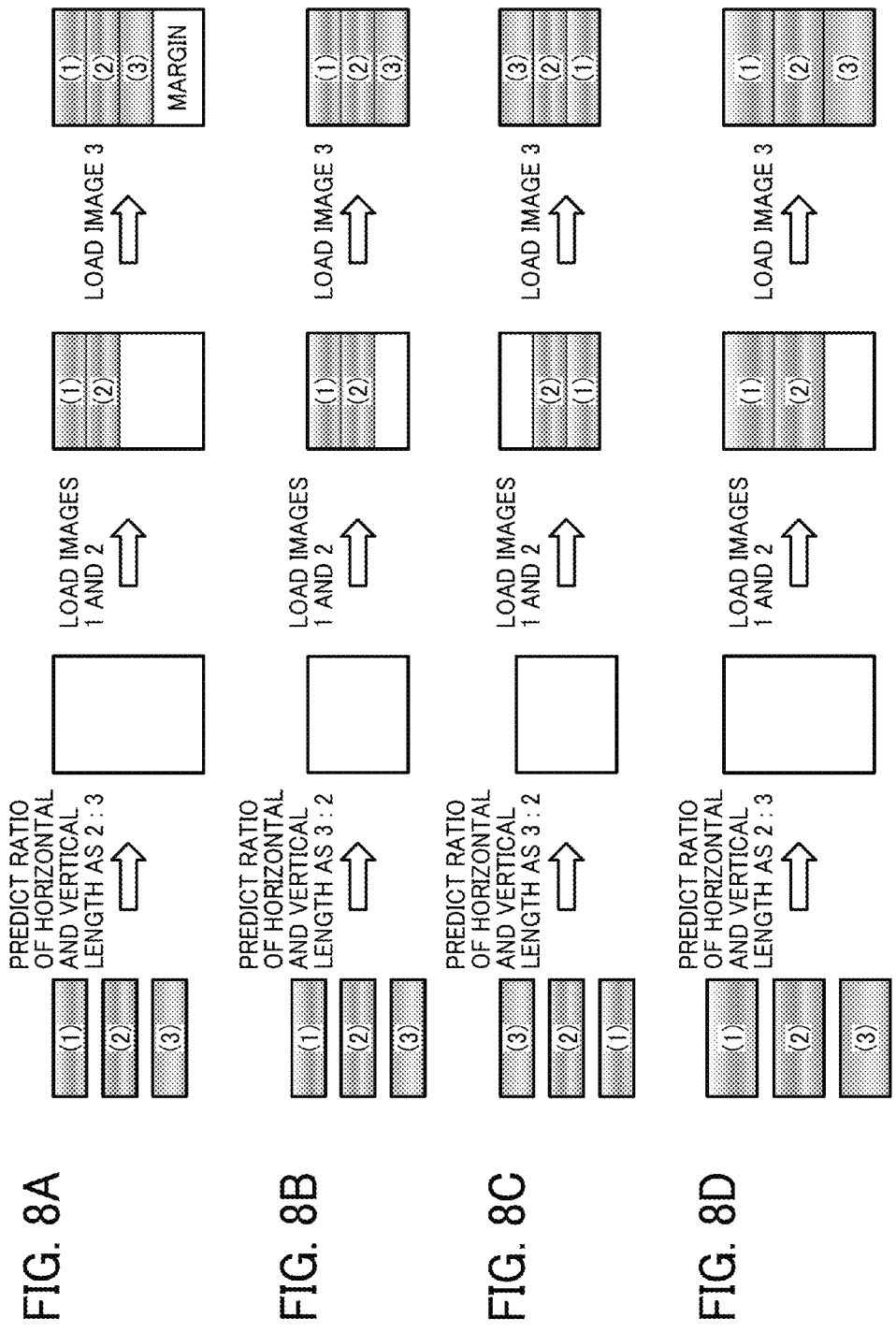

INFORMATION PROCESSING APPARATUS CONFIGURED TO PREDICT A SIZE OF A STORAGE-USE REGION, METHOD, IMAGE PROCESSING SYSTEM, AND STORAGE MEDIUM

CROSS-REFERENCE TO RELATED APPLICATION

This application claims priority pursuant to 35 U.S.C. § 119(a) to Japanese Patent Application Nos. 2015-177609, filed on Sep. 9, 2015, and 2016-141263, filed on Jul. 19, 2016 in the Japan Patent Office, the disclosure of which are incorporated by reference herein in their entirety.

BACKGROUND

Technical Field

This disclosure relates to an information processing apparatus that merges a plurality of image data, an image processing method that merges a plurality of image data, an image processing system including the information processing apparatus and storage medium of a program for executing the image processing method.

Background Art

When an application or operating system (OS) divides or splits an original image data having a greater data size into a plurality of sub-image data, the plurality of sub-image data is compared line by line or row by row to determine whether the plurality of sub-image data have an overlapping portion, and then reconfigures the original image data by merging the plurality of sub-image data.

However, since the image size of the original image data (i.e., data before dividing) is not known, one storage-use region secured in a memory may not be sufficient to merge the plurality of the sub-image data, and thereby another storage-use region is required to be secured in the memory instead of the one storage-use region, which means two storage-use regions are required to set in the memory, and thereby the efficiency of memory resource use becomes lower.

SUMMARY

As one aspect of the present invention, an information processing apparatus is devised. The information processing apparatus includes a memory, and circuitry. The circuitry acquires a plurality of images divided from original image data, the plurality of images including at least a first image data and a second image data, predicts a size of a storage-use region in the memory, the storage-use area to be used for storing the plurality of image data to be merged based on image information of the acquired first image data, secures the predicted size of the storage-use region in the memory, merges the plurality of image data in the storage-use region secured in the memory based on image information of the acquired first image data, and stores the merged plurality of image data in the storage-use region secured in the memory.

As another one aspect of the present invention, a method of merging image data is devised. The method includes acquiring a plurality of images divided from original image data, the plurality of images including at least a first image data and a second image data, predicting a size of a storage-use region in the memory, the storage-use area to be used for storing the plurality of image data to be merged based on image information of the acquired first image data, securing the predicted size of the storage-use region in the memory, merging the plurality of image data in the storage-use region secured in the memory based on image information of the acquired first image data, and storing the merged plurality of image data in the storage-use region secured in the memory.

As another one aspect of the present invention, a non-transitory storage medium storing a program that, when executed by a computer, causes the computer to execute a method of merging image data, is devised. The method includes acquiring a plurality of images divided from original image data, the plurality of images including at least a first image data and a second image data, predicting a size of a storage-use region in the memory, the storage-use area to be used for storing the plurality of image data to be merged based on image information of the acquired first image data, securing the predicted size of the storage-use region in the memory, merging the plurality of image data in the storage-use region secured in the memory based on image information of the acquired first image data, and storing the merged plurality of image data in the storage-use region secured in the memory.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A schematically illustrates a process of dividing, merging and printing image data of conventional art;

FIG. 5B schematically illustrates a process of dividing, merging and printing image data of one example embodiment of the present invention;

FIGS. 8A, 8B, 8C and 8D illustrate examples of dividing and merging of image data using a memory.

Figure 1:
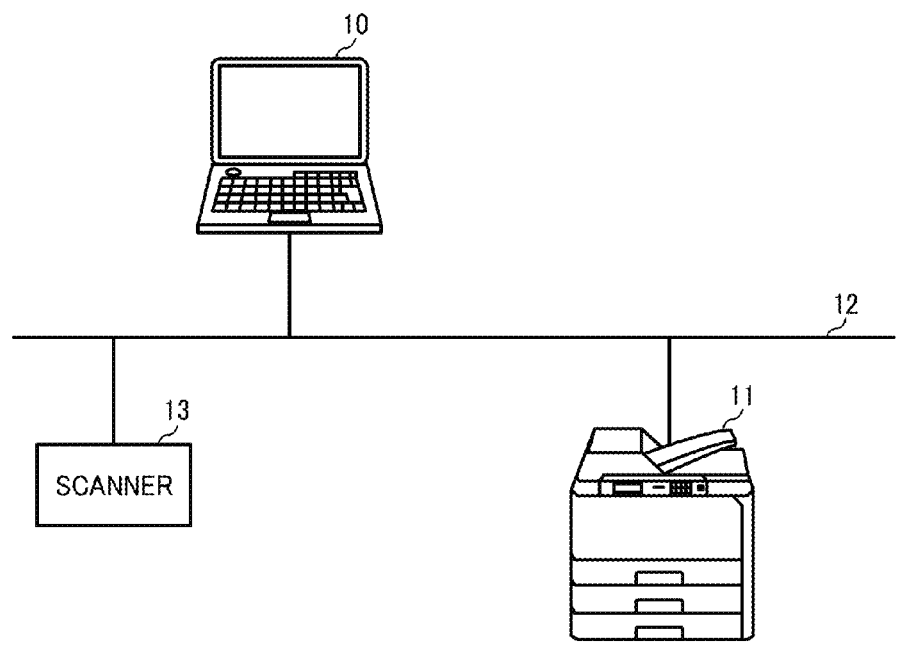
FIG. 1 is an example of a schematic diagram of an image processing system of one example embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

FIG. 1 is a schematic configuration of an image processing system of one example embodiment of the present invention. In the image processing system, when image data is generated, an image drawing process is performed based on an image forming instruction to the image data, a command to perform the image forming operation is generated, and then the image forming operation is performed based on the command. Therefore, the image processing system includes an information processing apparatus that generates the image data, performs the image drawing process, generates the command, and an image forming apparatus that performs the image forming operation based on the command.

In an example configuration of FIG. 1, a personal computer (PC) 10 is employed as one example of the information processing apparatus, and a printing apparatus 11 is employed as one example of the image forming apparatus. The printing apparatus 11 can be, for example, a printer or a multi-function peripheral (MFP) including printing, scanning and facsimile communication capabilities. The printer can be, for example, an electrophotography printer or an inkjet printer. In this description, the PC 10 is used as the information processing apparatus, and the printing apparatus 11 is used as the image forming apparatus, but not limited hereto. For example, the information processing apparatus can be a tablet terminal, a workstation, a smartphone, and the image forming apparatus can be a copier or a facsimile machine.

The PC 10 can be connected with the printing apparatus 11 directly via a cable. Further, the PC 10 can be connected or coupled with the printing apparatus 11 via a network 12 as indicated in FIG. 1. The network 12 can be, for example, a local area network (LAN), wide area network (WAN), and/or the Internet. The network 12 can be, for example, a wired network or a wireless network such as a wireless LAN. The network 12 is not limited to one network. For example, the network 12 includes two or more networks connectable by using a relay such as a router and a proxy server. When the two or more networks include a wired network and a wireless network, an access point can be used to connect to the wired network. Further, a scanner 13 can be connected or coupled to the network 12.

The PC 10 generates image data when a user inputs information to the PC 10. The PC 10 secures a storage-use region in a memory when the user instructs a print instruction, and performs an image drawing process using the storage-use region secured in the memory. The storage-use region may be also referred to as the storage-use area. Then, the PC 10 converts the data processed by the image drawing process to a print command, and transmits the print command to the printing apparatus 11 via the network 12. The printing apparatus 11 interprets the received print command, and performs a printing operation onto a recording medium such as a sheet based on the print command.

Figure 2:
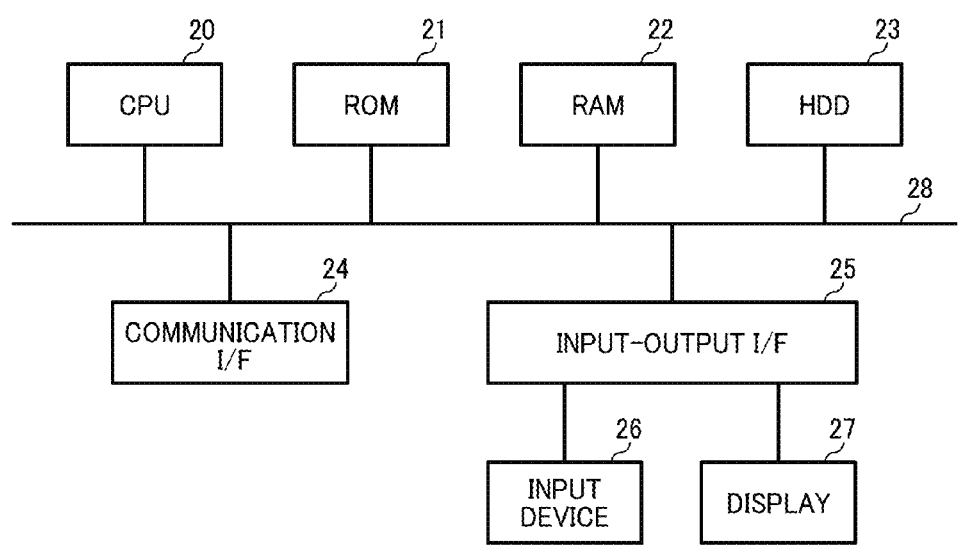
FIG. 2 is an example of a hardware configuration of an information processing apparatus employed in the image processing system of FIG. 1.

The PC 10 has a hardware configuration of FIG. 2 to implement the above described processes. The hardware configuration of the PC 10 includes, for example, a central processing unit (CPU) 20, a read only memory (ROM) 21, a random access memory (RAM) 22, a hard disk drive (HDD) 23, a communication interface (I/F) 24, an input-output interface (I/F) 25, an input device 26 and a display 27. The CPU 20, the ROM 21, the RAM 22, the HDD 23, the communication I/F 24, and the input-output I/F 25 can be connected by a bus 28 for communicating information one to another.

The CPU 20 is a computing unit such as a processor or circuitry that controls the PC 10 entirely, and implements applications, OS, and a printer driver to be described later. The ROM 21 is a non-volatile memory that stores a boot program and firmware to activate the PC 10. The RAM 22 is a volatile memory used as a working area for the CPU 20, and can be used as a memory that provides the above mentioned storage-use region. The HDD 23 is a non-volatile memory that stores application, OS, the printer driver, various data. The HDD 23 can be also used as the memory that provides the above mentioned storage-use region. The applications can be stored in the HDD 23 and other storage device such as a solid state drive (SSD).

The communication I/F 24 is used connect the PC 10 to the network 12 to enable the communication via the network 12. The input-output I/F 25 provides information input from then input device 26 to the CPU 20 via the bus 28, and outputs target display information to the display 27. The input device 26 can be a keyboard and a mouse that receives information input by a user. The display 27 can be a cathode ray tube (CRT), a liquid crystal display, and an organic electroluminescence (EL) display, and displays generated image data, a print setting screen, and an error screen.

The printing apparatus 11 employs a hardware configuration including, for example, a controller including a CPU, a ROM, a RAM, a HDD, a printer engine to perform the printing, and a communication I/F connectable to the network 12. The electrophotography printer engine includes an exposure, a photoconductor drum, a development unit, a transfer unit, and a fixing unit. The inkjet printer engine includes an ink tank, a pump, a dispense head.

Figure 3:
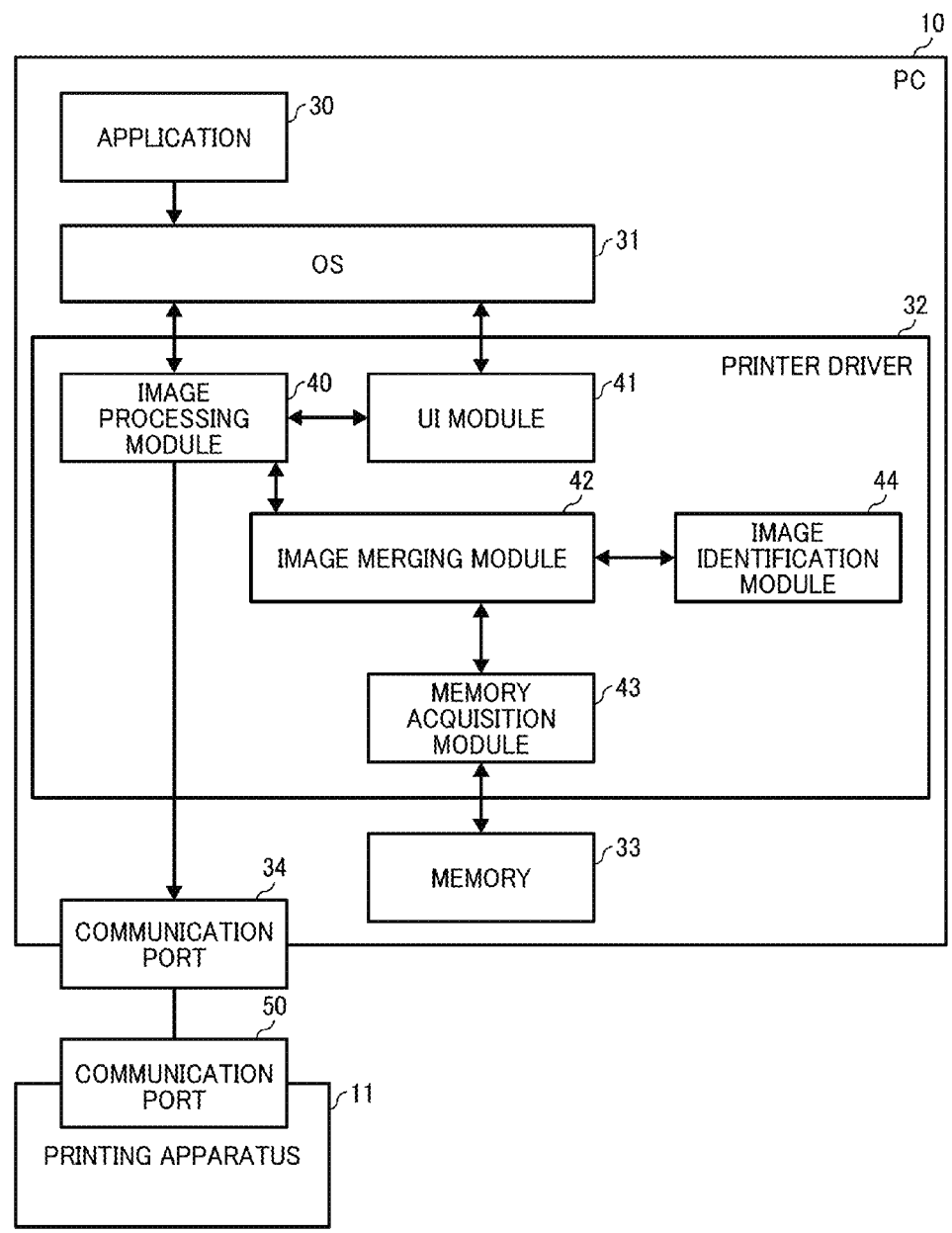
FIG. 3 is an example of a software configuration of the information processing apparatus of FIG. 2.

FIG. 3 illustrates a software module of the PC 10 to implement the above mentioned processing. The software module of the PC 10 includes an application 30, an operating system (OS) 31, and a printer driver 32. The application 30 generates image data, and requests the OS 31 to perform a printing process when a print instruction is received from a user. The OS 31 provides a basic operation that both of the application 30 and the printer driver 32 use. Therefore, the application 30 and the printer driver 32 can be implemented under the control of the OS 31.

The printer driver 32 performs various processing such as securing a storage-use region in a memory, image merging, image drawing process, and generating and transmitting a print command. The printer driver 32 includes, for example, an image processing module 40, a user interface (UI) module 41, an image merging module 42, a memory acquisition module 43, and an image identification module 44 as illustrated in FIG. 3.

The image processing module 40 acquires the image data from the OS 31 as print data, performs an image drawing process to the print data, and converts the print data processed by the image drawing process to a print command interpretable by the printing apparatus 11. The UI module 41 reports a list of capabilities of the printing apparatus 11 to the application 30 and the OS 31, and implements communication with a user by providing a UI.

When an original image data having a greater size is to be processed, the application 30 and the OS 31 divides or splits the original image data into a plurality of image data because the memory resource is limited. When the original image data is divided into the plurality of image data, the plurality of image data is received by the image processing module 40 and then transferred to the image identification module 44 via the image merging module 42. The image identification module 44 receives and analyzes the plurality of image data one by one, and determines whether the plurality of image data is to be merged.

The image merging module 42 merges the plurality of image data when the image identification module 44 determines that the plurality of image data is to be merged, in which the image merging module 42 instructs the memory acquisition module 43 to acquire a storage-use region in the memory so that to-be-merged image data can be stored. Based on the instruction of the image merging module 42, the memory acquisition module 43 secures and acquires the storage-use region in the memory 33. Then, the memory acquisition module 43 reports the storage-use region secured in the memory 33 to the image merging module 42. The image merging module 42 merges the plurality of image data, which are determined to be merged, by using the storage-use region secured in the memory 33 acquired by using the memory acquisition module 43.

The image processing module 40 performs the image drawing process to the plurality of image data, and transfers the plurality of image data processed by the image drawing process to the image merging module 42 to perform the merging process. The image processing module 40 receives the plurality of image data merged by the image merging module 42, and converts the image data to a print command, and transmits the print command to the printing apparatus 11 via a communication port 34. The communication port 34 can be a universal serial bus (USB) port and local area network (LAN) port implemented by the communication I/F 24 of FIG. 2. The communication port 34 can be connected to a communication port 50 of the printing apparatus 11.

Figure 4:
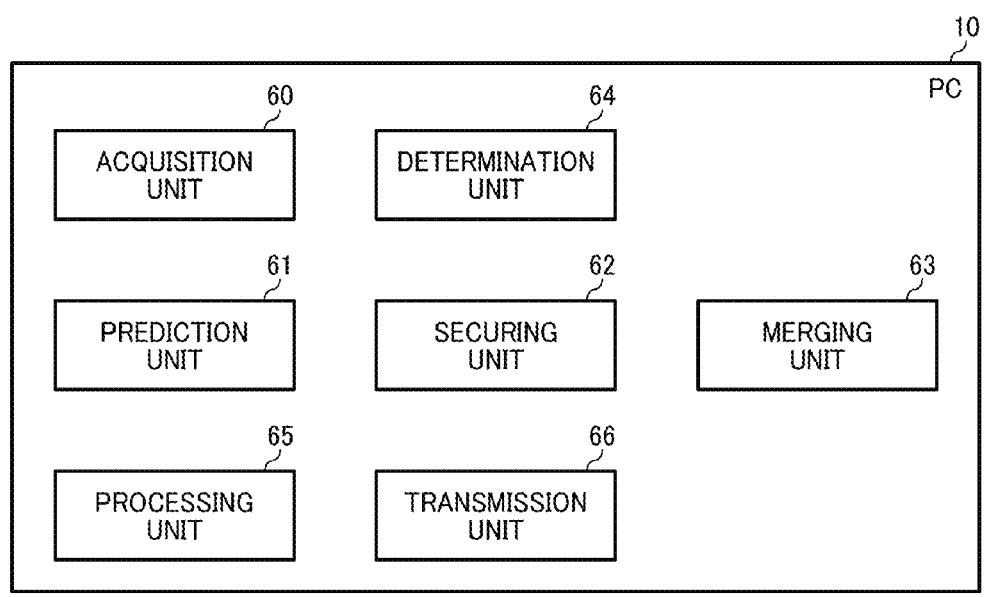
FIG. 4 is a functional block diagram of the information processing apparatus FIG. 2.

FIG. 4 is a functional block diagram of the printer driver 32. Since the printer driver 32 is installed in the PC 10, and the above described capabilities and functions are devised by activating the PC 10, and thereby the PC 10 can devise the above described capabilities and functions. The PC 10 can devise, for example, an acquisition unit 60, a prediction unit 61, a securing unit 62, a merging unit 63, a determination unit 64, a processing unit 65, and a transmission unit 66 as illustrated in FIG. 4.

The acquisition unit 60 can be devised by the image processing module 40 of the printer driver 32 (FIG. 3). The acquisition unit 60 acquires print data from the OS 31. The print data can be image data, and text data or the like. The acquisition unit 60 transfers the acquired print data to the determination unit 64. The determination unit 64 can be devised by the image identification module 44 of the printer driver 32 (FIG. 3). The determination unit 64 determines whether the print data is image data. If the print data is the image data, the determination unit 64 determines whether the image data is the first image data to be merged. The determination unit 64 can determine whether the image data is the first image data based on continuity of the currently-acquired image data and other image data already stored in the storage-use region in the memory. If no other image data is stored in the storage-use region in the memory, the currently acquired image data can be determined as the first image data. Further, even if the other image data is already stored in the storage-use region of the memory, if the currently-acquired image data is not continued from the already-stored other image data, the currently-acquired image data can be determined as the first image data.

The prediction unit 61 can be devised by the image identification module 44 of the printer driver 32 (FIG. 3). The prediction unit 61 predicts a size of the storage-use region to be used for merging a plurality of image data, and then storing the merged plurality of image data based on image information of a first image data or image information of the first image data and image information of a second image data having the continuity with the first image data. Specifically, the image information includes, for example, information of a vertical side length and a horizontal side length of image data of image data such as a ratio of the horizontal length and the vertical length of image data, which indicates a short side and a long side of image data, and image identification information used for identifying types of image data. The prediction unit 61 can predict the to-be-acquired storage-use region size by calculating the required storage-use region size using the image information and the image identification information. A method of calculating the storage-use region size will be described later.

The prediction unit 61 reports the predicted storage-use region size to the securing unit 62. The securing unit 62 can be devised by the memory acquisition module 43 of the printer driver 32 (FIG. 3). The securing unit 62 secures the reported storage-use region size as the storage-use region in the memory. The memory is, for example, the RAM and/or the HDD. The merging unit 63 can be devised by the image merging module 42 of the printer driver 32 (FIG. 3). The merging unit 63 loads the image data on the storage-use region secured in the memory, and merges the image data in the memory. The image data can be merged, for example, by using coordinates of pixels composing the image data. The merging unit 63 performs the image merging process until the to-be-merged image data becomes zero. When the merging unit 63 merges all of the image data, the merging unit 63 requests the processing unit 65 to process the merged image data.

The processing unit 65 can be devised by the image processing module 40 of the printer driver 32 (FIG. 3). After receiving the request to process the merged image data from the merging unit 63, the processing unit 65 converts the merged image data to generate a print command interpretable by the printing apparatus 11. Then, the processing unit 65 requests the transmission unit 66 to transmit the print command to the printing apparatus 11. The transmission unit 66 can be devised by the image processing module 40 and the communication port 34 of the printer driver 32 (FIG. 3). After receiving the request from the processing unit 65, the transmission unit 66 transmit the print command to the printing apparatus 11.

A description is given of an overall processing including dividing and merging image data, and outputting the merged image data with reference to FIGS. 5A and 5B. As illustrated in FIGS. 5A and 5B, a user activates the application 30 on the PC 10 to display image data 70, and instructs a printing of the image data 70. The image data 70 can be photo data captured by an image capture such as a digital camera, or data scanned by a scanner. Further, the image data 70 can be data prepared by processing some data using the application 30. For example, the photo data captured by the digital camera may be composed of 4,000 pixels or more in the vertical side length and the horizontal side length, with which data size becomes several megabytes (MB). In this case, when a user instructs the application 30 to perform the printing, the application 30 divides or splits the image data 70 into a plurality of image data, and transmits the plurality of image data and instructs a printing process.

In a case of FIG. 5A, the application 30 divides the image data 70 into three image data 70a, 70b, and 70c. This dividing process can be performed as an internal process that does not require a user operation. Each of the divided image data 70a, 70b, and 70c is transferred to the OS 31 to perform the printing process. Since the OS 31 does not have information indicating that the application 30 divides the one image data into the three image data and outputs the three image data, the OS 31 performs the printing process for each of the image data 70a, 70b, and 70c independently. Therefore, the OS 31 processes each of the image data 70a, 70b, and 70c independently, in which each of the image data 70a, 70b, and 70c are processed as unrelated data.

The OS 31 transfers the image data 70a, 70b, 70c to the printer driver 32 to perform the printing process. FIG. 5A illustrates a conventional case that a printer driver performs the image drawing process to the image data 70a, 70b, and 70c one by one as unrelated data, converts the image data to a print command one by one, and transmits the print command to the printing apparatus 11 one by one. Then, the printing apparatus 11 performs the printing on a sheet with an order of the print commands sequential transmitted from the printer driver.

By contrast, when the printer driver 32 of FIG. 3 is employed, the printer driver 32 analyzes whether the image data 70a, 70b, and 70c have the continuity as illustrated in FIG. 5B, in which the printer driver 32 analyzes the continuity of the plurality of image data based on the horizontal size (i.e., width length) and the vertical size (i.e., vertical length) of the image data, the magnification ratio of the image data, the image format of the image data, and drawing coordinates of the image data. If the printer driver 32 determines that the image data 70a, 70b, and 70c have the continuity, the printer driver 32 secures the storage-use region in the memory to perform the merging process of the image data 70a, 70b, and 70c. When the image data merging process is completed, the printer driver 32 generates a print command, and transmits the print command to the printing apparatus 11. The printing apparatus 11 performs the printing on a sheet based on the print command.

Figure 6:
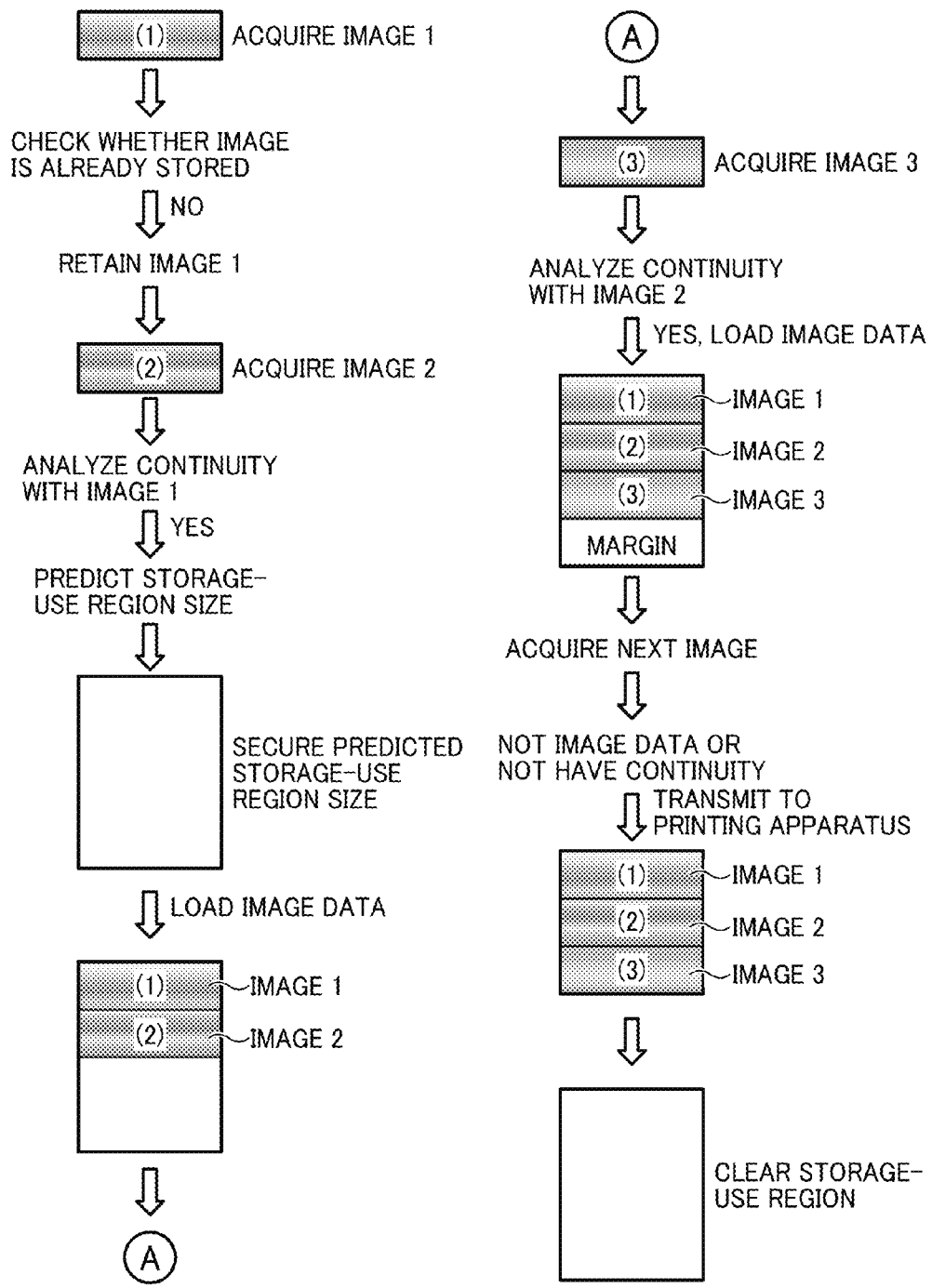
FIG. 6 illustrates a process of dividing and merging of image data using a memory of one example embodiment of the present invention.

A description is given of a process of merging the image data of FIG. 5B with reference to FIG. 6. The acquisition unit 60 acquires a plurality of image data, divided by the application 30, one by one from the OS 31 as print data. In an example case of FIG. 6, one of the divided image data is acquired as an image 1. The determination unit 64 checks whether other image data is already stored in the storage-use region in the memory. If the other image data is not stored in the storage-use region in the memory, and thereby the image 1 is the first image data to be stored in the storage-use region in the memory, the image 1 is stored in a region of the memory, and then the processing is returned to the OS 31. In this processing, the first image data is required to be written on the memory so that the printer driver 32 can perform the processing to the image data transmitted from the application 30.

After returning the processing to the OS 31, the acquisition unit 60 acquires next print data from the OS 31. The next print data is also one of the divided image data, and acquired as an image 2. Since the image 1 is already stored in the storage-use region in the memory, the determination unit 64 analyzes the continuity of the already-stored image 1 and the currently acquired image 2. The continuity between the two image data can be determined by checking the image size, the image format, and drawing coordinates of image data. If the determination unit 64 determines that the image 1 and the image 2 have the continuity, the determination unit 64 reports the continuity of the image 1 and the image 2 to the prediction unit 6. Then, the prediction unit 61 predicts a size of the storage-use region in the memory, in which the size of the storage-use region can be predicted or calculated based on the image information such as the image size. Normally, the size of the storage-use region can be a default size such as a fixe size defined by the printer driver 32.

The prediction unit 61 reports the predicted storage-use region size to the securing unit 62, and the securing unit 62 secures the storage-use region in the memory, in which the storage-use region is secured as one storage-use region having a given size in the memory. Specifically, since the image 1 is already written in the region of the memory, the securing unit 62 secures the one storage-use region with the above mentioned predicted size so that the one storage-use region can include the region already storing the image 1 and other region continued from the region already storing the image 1.

The securing unit 62 secures the predicted size of the storage-use region in the memory, and reports that the acquisition of the storage-use region in the memory to the merging unit 63. Then, the merging unit 63 loads the image 1 and the image 2 on the storage-use region secured in the memory, and merges the image 1 and the image 2 on the secured storage-use region, with which the image 1 and the image 2 are merged and stored on the storage-use region secured in the memory. Since the image 1 is already written in the memory as above described, the image 1 is not required to be read and loaded when the merging unit 63 merges the image 1 and the image 2, but the image 2 alone is loaded and then merged with the image 1 by using the merging unit 63.

After the merging process is completed, the merging unit 63 reports a completion notice to the determination unit 64, and then the determination unit 64 returns the processing to the OS 31. After returning the processing to the OS 31, the acquisition unit 60 acquires next print data from the OS 31. The next print data is also one of the divided image data, and acquired as an image 3. When the determination unit 64 analyzes the continuity of the already stored image 2 and the currently acquired image 3, similar to the above, and then determines that the image 2 and the image 3 have the continuity, the determination unit 64 requests the merging unit 63 to perform the merging process of the image 3 because the storage-use region in the memory is already secured as above described. Then, the merging unit 63 loads the image 3 after the image 1 and the image 2 on the storage-use region in the memory secured by the securing unit 62, and merges the image 1, the image 2 and the image 3. Then, the determination unit 64 returns the processing to the OS 31.

If the print data acquired from the OS 31 is not the image data, or ever if the print data acquired from the OS 31 is the image data but the acquired print data does not have the continuity with the image 1 to image 3, the processing unit 65 acquires the merged image data (i.e., images 1, 2, 3) stored in the storage-use region in the memory. Then, the processing unit 65 converts the merged image data to a print command, and requests the transmission unit 66 to transmit the print command to the printing apparatus 11. After receiving the request, the transmission unit 66 transmits the print command to the printing apparatus 11 to perform the printing of the merged image data (i.e., images 1, 2, 3). When the transmission unit 66 transmits the print command to the printing apparatus 11, the transmission unit 66 reports to the securing unit 62 that the print command is transmitted to the printing apparatus 11. After receiving the report, the securing unit 62 clears the storage-use region secured in the memory, with which the storage-use region secured in the memory can be used to store another data.

A description is given of a conventional case that the application divides the original image data, the first image data is transmitted at first, and stored in a region in a memory without predicting the size of region. In this conventional case, next data that is not the image data (non-image data) may be written from other application in another region next to the region storing the first image data, and then another image data (second image data) continued from the first image data is transmitted from the application. However, the second image data cannon be stored in a region continued from the region currently storing the first image data because the non-image data is stored next to the first image data. In this case, since the first image data and the second image data cannon be stored as continued image data in the memory, a new region that can store the first image data and the second image data is required to be secured in the memory, and then the first image data and the second image data are loaded on the newly secured region in the memory. Therefore, the processing load of the printer driver becomes greater because the region is re-set in the memory, which is not preferable. By contrast, if the storage-use region is secured in the memory by predicting the size of storage-use region as above described as one example of the present invention, the processing load of the printer drive can be reduced effectively because the above situation of the conventional case can be avoided.

Figure 7A:
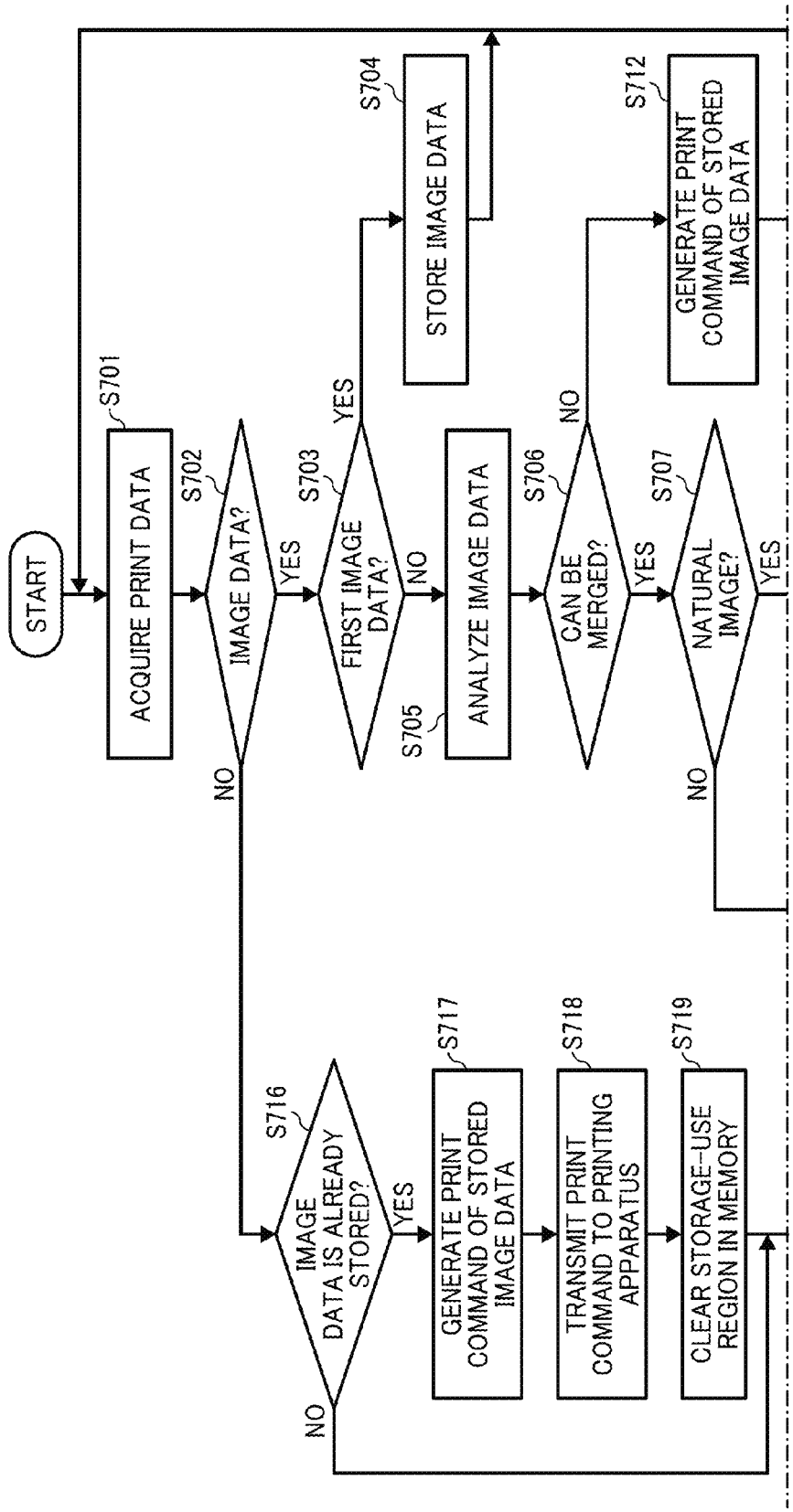
FIGS. 7A and 7B is a flow chart illustrating the steps of a process performed by the information processing apparatus of FIG. 2.
Figure 7B:
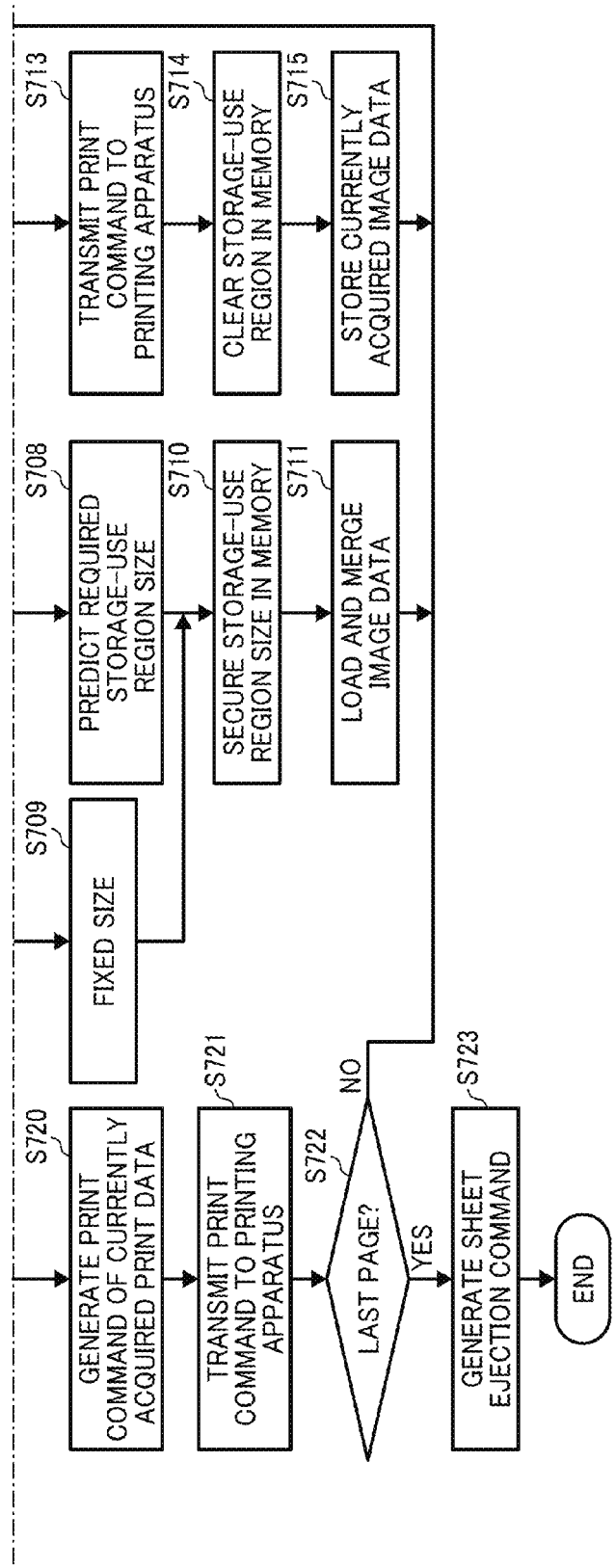

A description is given of a detail of a process performed in the PC 10 with reference to FIGS. 7A and 7B, which is a flow chart illustrating the steps of the process performed in the PC 10, in which the process is started when a user instructs a printing instruction to the application 30. For example, the user can instruct the printing by pressing a printing start button on the application 30. After receiving the printing instruction, the application 30 requests the OS 31 to perform the printing process, in which the application 30 divides an image having greater image size into a plurality of image data. After receiving the printing request from the application 30, the OS 31 starts the printing process.

At step S701, the acquisition unit 60 acquires the print data from the OS 31. At step S702, the determination unit 64 determines whether the print data is image data such as photo data based on image information such as the size and format of the print data. If the acquired print data is the image data (S702: YES), the sequence proceeds to step S703. At step S703, it is determined whether other image data is already stored in the memory, in other words, it is determined whether the image data (S702: YES) is the first image data to be stored in the memory. If the other image data is not stored in the memory (S703: YES), the sequence proceeds to step S704, and the image data acquired at S702 is stored in the memory (S704), and the processing is returned to the OS 31. If the other image data is already stored in the memory (S703: NO), the sequence proceeds to step S705, and the continuity of the stored other image data and the image data acquired currently from the OS 31 is analyzed at step S705. In this example case, the storage-use region in the memory used for the image data merging is acquired after confirming the continuity of image data to enhance the efficiency of memory resource use. However, the data size of to-be-merged image data can be predicted by using the first image data alone when the first image data is acquired.

At step S706, it is determined whether the two image data can be merged based on the continuity analysis result. If it is determined that the two image data have the continuity and can be merged (S706: YES), the sequence proceeds to step S707. At step S707, it is determined whether the merged two image data is a natural image, which is one type of images, which means it is determined whether the image data is the natural image captured by a digital camera or an artificial image generated from another data not related to the nature such as a screen shot image and paint image. Further, if the image data is the natural image such as photo data, it is further determined whether the image data is a scene image (i.e., landscape image) or a human image (i.e., portrait image). If the image data is the natural image, the sequence proceeds to step S708, and if the image data is the artificial image, the sequence proceeds to step S709.

At step S708, if the image data is the natural image, the image data can be photo data with a higher probability. Therefore, the prediction unit 61 determines that the ratio of the short side and the long side of the image data is, for example, 2:3 or 3:4 typically set for the photo data, and predicts the size of the storage-use region required for storing the image data based on the ratio of the short side and the long side of the image data because the original image to be re-generated by merging the divided image data can be predicted to have 2:3 or 3:4 as the ratio of the short side and the long side of the image. The required storage-use region size can be predicted based on the image information of the acquired image data such as the image size, image format, and the type of image such as scene image and human image.

For example, if the image data is the scene image, the prediction unit 61 can determine the image data is the landscape image having the ratio of 2:3 or 3:4 for the vertical length and the horizontal length, wherein the horizontal length of the landscape image is greater than the vertical length of the landscape image. Further, if the image data is the human image, the prediction unit 61 can determine the image data is the portrait image having the ratio of 3:2 or 4:3 for the vertical length and the horizontal length, wherein the vertical length of the portrait image is greater than the horizontal length of the portrait image. The ratio of the horizontal length and the vertical length of image data is determined as above described. If one first image data is acquired as the human image and another first image data is acquired as the scene image with the same image size, the storage-use region to be secured for the human image becomes greater than the storage-use region to be secured for the scene image.

Even if it is determined that the image data is the human image, the exact size of the vertical side of the human image is not known yet. Therefore, if the image data is the natural image, the storage-use region can be secured by using the default ratio of the horizontal length and the vertical length of image such as the ratio of 3:2 for the horizontal length and the vertical length corresponding to the largest storage-use region, which is applied for the portrait image. Therefore, to prevent a situation that the secured storage-use region size is too small, the largest storage-use region size can be used based on an assumption that the image data is the portrait image to secure a sufficient size for the storage-use region in the memory. However, if it is determined that the image data is the landscape image in the above described process that determinates whether the image data is the landscape image or the portrait image, the storage-use region size can be predicted based on an assumption that the image data is the landscape image.

The printer driver 32 can process the photo data captured by the image capture such as a digital camera, and also data received from a facsimile machine or data scanned by a scanner. If the printer driver 32 processes the data received from the facsimile machine or the data scanned by the scanner, the size of the storage-use region size can be predicted using the ratio of the horizontal length and the vertical length of the sheet instead of the ratio of the horizontal length and the vertical length of the photo data. Since the ratio of the horizontal length and the vertical length of the sheet varies depending on types of sheets such as A-size (e.g., A4), B-size (e.g., B4), and Letter size, the ratio of the horizontal length and the vertical length of the sheet can be changed depending on countries of users. Further, when the scanner is used to scan an image, a margin area may be detected for the scanned image based on the image analysis, in which it can be determined that the image data is scanned by the scanner because the margin area is detected.

If the image data is the artificial image (S707: NO), at step S709, the ratio of the horizontal length and the vertical length of the image can be set any values with a higher probability because the aspect ratio of the artificial image can be changed variably. In this case, the size of to-be-acquired storage-use region can be set with a default value such as a fixed size defined by the printer driver 32. At step S710, the securing unit 62 secures the storage-use region having a given size in the memory predicted at step S708 or step S709, in the storage-use region is the one region having the given size in the memory. Then, at step S711, the merging unit 63 loads the stored image data and the image data acquired from the OS 31 on the acquired storage-use region in the memory, and merges the image data.

After completing the image data merging, the processing for the currently acquired image data is completed, and the sequence returns to step S701, and the sequence waits to receive next print data from the OS 31. When the next print data is received and the received print data is image data, the sequence after step S702 is repeated.

If it is determined that the two image data cannot be merged at step S706, the sequence proceeds to step S712. At step S712, the processing unit 65 converts the image data stored in the storage-use region in the memory to generate a print command because the image data stored in the storage-use region in the memory can be determined as the image data is not related to the image data currently acquired at S702. Then, at step S713, the transmission unit 66 transmits the print command to the printing apparatus 11. At step S714, the securing unit 62 clears the storage-use region in the memory used for the storing the image data. At step S715, the determination unit 64 stores the currently acquired image data in the memory that clears the storage-use region, which means the storage-use region in the memory can be re-used. After storing the currently acquired image data in the memory, the sequence returns to step S701, and the sequence waits to receive print data from the OS 31.

Further, if the print data acquired at step S702 is not the image data (S702: NO) such as text data, the sequence proceeds to step S716. At step S716, it is determined whether the image data is already stored in the storage-use region in the memory. If the image data is already stored in the storage-use region in the memory (S716: YES), the sequence proceeds to step S717. At step S717, the processing unit 65 converts the image data stored in the storage-use region in the memory to a print command. At step S718, the transmission unit 66 transmits the print command to the printing apparatus 11. At step S719, the securing unit 62 clears the storage-use region in the memory used for storing the image data.

If the image data is not stored in the memory at step S716 (S716: NO), or the storage-use region in the memory is cleared at step S719, at step S720, the processing unit 65 converts the print data that is the image data not acquired currently to a print command. Then, at step S721, the transmission unit 66 transmits the print command to the printing apparatus 11.

At step S722, the determination unit 64 determines whether the print command of the print data of the last page is transmitted. The determination unit 64 can determine whether the print command is for the last page data by comparing the numbers of transmitted print command and the total page numbers corresponding to the print requests. If the numbers of transmitted print command matches the total page numbers corresponding to the print requests, the determination unit 64 can determine that the print command is for the last page data. If the determination unit 64 determines that the print command is not for the last page (S722: NO), the sequence returns to step S701, and the acquisition unit 60 acquires the next print data from the OS 31. If the determination unit 64 determines that the print command is for the last page (S722: YES), the sequence proceeds to step S723, and the processing unit 65 generates a sheet ejection command that designates a sheet ejection destination. The transmission unit 66 transmits the sheet ejection command to the printing apparatus 11. After the sheet ejection command is transmitted, the sequence ends.

A description is given of a process of merging a plurality of divided image data with reference to FIG. 8. For example, the application 30 divides original image data into three image data such as image 1, image 2 and image 3, and the printer driver 32 sequentially acquires the image 1 to image 3 as the divided image data from the OS 31. Then, the printer driver 32 can predict the total size of the original image when the image 1 and the image 2 are acquired or when the image 1 alone is acquired.

In example cases of FIG. 8, the image data is assumed as the photo data. In an example case of FIG. 8A, the photo data is assumed as the portrait image and the ratio of the horizontal length and the vertical length of image is predicted as 2:3 so that the image height becomes the highest, and then the storage-use region used for storing the image data is secured in the memory. When the storage-use region in the memory is secured, the image 1 and the image 2 are loaded on the storage-use region in the storage-use region, and then merged. Then, the remaining image 3 is loaded on the storage-use region, and merged. In the example case of FIG. 8A, the storage-use region secured in the memory has a margin. However, since the size of the storage-use region secured in the memory is smaller than a default size of the storage-use region defined by the printer driver 32, the efficiency of memory resource use can be enhanced.

In an example case of FIG. 8B, the photo data is assumed as the landscape image by performing the image analysis, in which the size of the storage-use region is predicted based on the ratio of the horizontal length and the vertical length of 3:2 used for the landscape image, and a storage-use region (first storage-use region) for storing the image data can be secured in the memory. When the first storage-use region is secured in the memory, the image 1 and the image 2 are loaded on the first storage-use region in the memory, and then merged. Then, the remaining image 3 is loaded on the first storage-use region in the memory, and merged. In this case, the size of the first storage-use region and the merged image data (i.e., images 1 to 3) becomes the same size, which may be a preferable case.

If an image 4 is further continued, the image 4 cannot be merged with the images 1 to 3 in the first storage-use region size. Therefore, another storage-use region (second storage-use region) having a size greater than the first storage-use region is secured in the memory, and the image 1 to the image 3 are reloaded on the second storage-use region, and then the image 4 is loaded on the second storage-use region, and merged.

Then, an image 5 and subsequent images may be further continued. If the image 5 and subsequent images can be merged with the images 1 to the image 4 in the second storage-use region, the image 5 is loaded on the second storage-use region, and merged. If the image 5 and subsequent images cannot be merged with the images 1 to the image 4 in the second storage-use region, another storage-use region (third storage-use region) having a size greater than the second storage-use region is secured in the memory, and the image 1 to the image 4 are reloaded on the third storage-use region, and then the image 5 and subsequent images are loaded on the third storage-use region, and merged.

In an example case of FIG. 8C, the photo data is assumed as the landscape image by performing the image analysis, in which the image 1 to image 3 are merged in the reverse sequence compared to the example case of FIG. 8B. As illustrated in FIG. 8C, the image 1 to image 3 can be sequentially loaded on the storage-use region in the memory in the reverse sequence and merged without problems.

In an example case of FIG. 8D, the photo data is assumed as the landscape image by performing the image analysis at first similar to the example case of FIG. 8B. In the example case of FIG. 8D, the photo data is, at first, assumed as the landscape image having the ratio of 3:2 for the horizontal length and the vertical length by performing the image analysis to the image 1. However, when the image 2 is acquired and checked, it is determined that the image height of the merged images 1 and 2 becomes higher than the image height of the assumed landscape image. In this case, the photo data is re-assumed as the portrait image instead of the landscape image, and the storage-use region size is predicted based on the ratio of 2:3 for the horizontal length and the vertical length as illustrated in FIG. 8D, and then the storage-use region size can be secured in the memory. When the storage-use region in the memory is secured, the image 1 and the image 2 are loaded and merged, and the image 3 is further loaded and merged.

As to the example cases of FIG. 8, the image merging is performed along the vertical direction but not limited hereto. The image merging can be performed along the horizontal direction for image data having the vertical length greater than the horizontal length from the left to the right or from the right to the left similar to the above the image merging.

Figure 9:
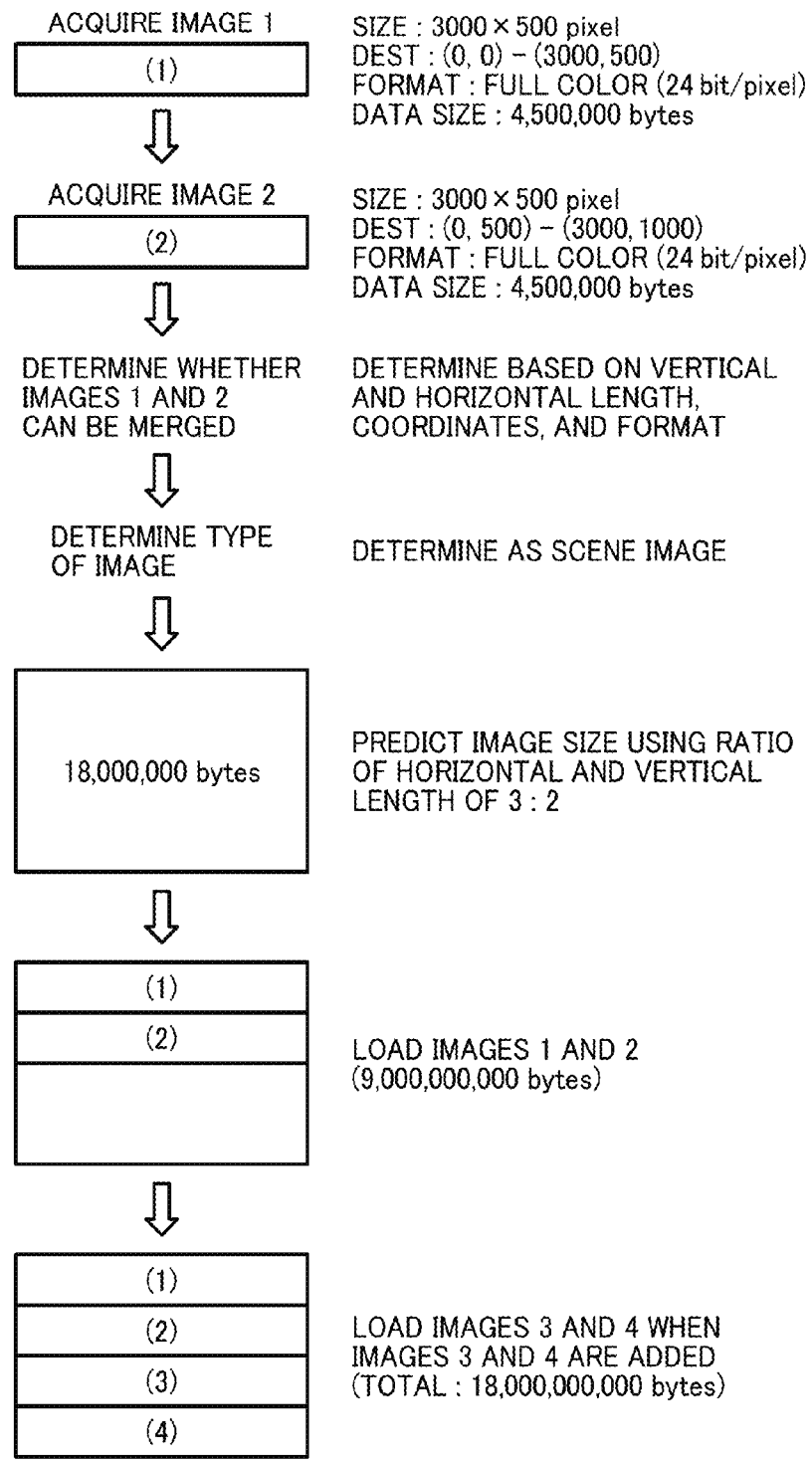
FIG. 9 illustrates one example of dividing and merging of image data using a memory.

A description is given of the process of merging the image data using numerical values with reference to FIG. 9. The application 30 divides original image data into a plurality of image data, and instructs the OS 31 to process the image data. The acquisition unit 60 acquires print data from the OS 31. In this example case of FIG. 9, the print data is the image data, and the print data is acquired as image 1 that is one of the plurality of image data. In the example case of FIG. 9, it is assumed that the acquired image 1 has the image width of 3,000 pixels, the image height of 500 pixels, and the image format of 24 bit/pixel. Since the image format is 24 bit/pixel, the acquired image 1 is a full color image, and each of pixels has 3-byte data, the data size of the image 1 becomes 3,000×500×3=4,500,000 bytes. Further, the image 1 is defined to be drawn by setting the original coordinates (0, 0) and the width of 3,000 pixel and the height of 500 pixels by using the printing apparatus 11.

Then, the acquisition unit 60 further acquires the next print data from the OS 31, in which the next print data is the image data, and acquired as image 2 that is one of the plurality of image data. Similar to the image 1, it is assumed that the acquired image 2 has the image width of 3,000 pixels, the image height of 500 pixels, and the image format of 24 bit/pixel. Therefore, the image 2 is also the full color image, and has the data size of 4,500,000 bytes. However, the image 2 is defined to be drawn by setting coordinates (0, 500) and the width of 3,000 pixel and the height of 500 pixels by using the printing apparatus 11.

The determination unit 64 determines whether the image 1 and the image 2 has the continuity based on the image information of the image 1 and the image 2. Specifically, the determination unit 64 determines that the image 1 and the image 2 have the continuity because the image 1 and the image 2 have the same image width, the image 1 and the image 2 are drawn continuously in the vertical direction, and the image 1 and the image 2 have the same image format of 24 bit/pixel. Then, the determination unit 64 determines the type of image by checking the image 1 and the image 2. For example, the image analysis indicates that a larger portion of the image 1 and the image 2 is occupied by blue, and the image 1 and the image 2 has not an artificial solid area, and this analysis information can be used as image identification information. Based on the image identification information, the determination unit 64 can determine the type of image is the natural image such as the landscape image. Therefore, the determination unit 64 predicts that the image is the landscape image having the ratio of 3:2 for the horizontal length and the vertical length.

Therefore, if the image has an image of person in the natural image and has no artificial solid area, the determination unit 64 can determine that the image is the natural image having the image of person. The known facial recognition technologies can be used to determine whether a person exists in the image.

Based on the above described processing, the prediction unit 61 predicts a total image size of the photo data when the plurality of image data is merged. In the example case of FIG. 9, the prediction unit 61 predicts that the photo data has the ratio of 3:2 for the horizontal length and the vertical length, which is the smallest ratio of the horizontal length and the vertical length, and then the image data are merged in the vertical direction. Since the image width is 3,000 pixels, the image height is calculated as 3000/3×2=2000 pixels. Therefore, the required storage-use region in the memory becomes 3000×2000×3=18,000,000 bytes. Then, the storage-use region having the predicted size is secured in the memory, which means the storage-use region of 18,000,000 bytes is secured in the memory.

The image 1 and the image 2 are consecutively loaded on the storage-use region secured in the memory, and then the image 1 and the image 2 are merged, in which the image size of the image 1 and the image 2 becomes 3000×1000×3=9,000,000 bytes. By loading the image 1 and the image 2, 9,000,000 bytes of the storage-use region having 18,000,000 bytes are used. When the image data having the same image size such as the image 3 and the image 4 that can be merged are further acquired, the image 3 and the image 4 are sequentially loaded and merged in the storage-use region in the memory. When the image 1 to the image 4 are merged, the merged image data has the image size of 18,000,000 bytes.

If the image data is the photo data of the landscape image, the storage-use region secured in the memory may not have the margin as above described, which means the efficiency of memory resource use can be enhanced. The image data merged on the storage-use region is converted to the print command, and the print command is transmitted to the printing apparatus 11.

As to the above described example embodiment, when the original image data is divided by the application 30 into a plurality of image data, and the plurality of image data is acquired, the image size of the original image data can be predicted from the acquired one or two image data. With employing this configuration, when the image merging is required, the size of the storage-use region used for processing the image data in the memory can be reduced effectively.

Further, as to conventional technologies, the storage-use region in the memory is extended each time the image data is acquired, in which re-acquiring of a new storage-use region occurs with a higher probability. By contrast, as to the above described example embodiment, since the required size of storage-use region is predicted and secured in the memory with a higher precision compared to conventional technologies, the probability of re-acquiring of the new storage-use region can be reduced effectively compared to conventional technologies, with which the printer driver 32 can enhance the efficiency of memory resource use.

As to the above described example embodiment of the present invention, when the plurality of image data is to be merged, the storage-use region can be secured in the memory without setting another storage-use region in the memory, with which the efficiency of memory resource use can be enhanced, and the apparatus and the method that can enhance the efficiency of memory resource use can be provided.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be merged each other and/or substituted for each other within the scope of this disclosure and appended claims.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

In case the present invention is implemented as software, the computer software can be provided to the programmable device using any conventional storage medium storing the computer software or can be transmitted to the programmable device from another device via the network. For example, the computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

What is claimed is:

1. An information processing apparatus comprising:
a memory; and
processing circuitry configured to,
acquire a plurality of images divided from original image data, the plurality of images including at least a first image data and a second image data,
predict a size of a storage-use region in the memory based on image information of the acquired first image data prior to obtaining image information of all of the plurality of images associated with the original image such that the size accommodates the plurality of images associated with the original image, the storage-use area configured to store the plurality of image data,
secure the predicted size of the storage-use region in the memory such that the storage-use region includes adjacent locations in the memory,
merge the plurality of image data in the storage-use region secured in the memory based on image information of the acquired first image data, and
store the merged plurality of image data in the storage-use region secured in the memory.

2. The information processing apparatus of claim 1, wherein the image information of the first image data includes information of a vertical length and a horizontal length related to the original image data, the original image data being at least one of a photo data captured by using an image capture and an image data on a sheet, and wherein the processing circuitry is configured to,
predict the size of the storage-use region based on a ratio of the vertical length and the horizontal length of at least one of the photo data and the sheet.

3. The information processing apparatus of claim 2, wherein the ratio of the vertical length and the horizontal length of the sheet is variably set based on a size of the sheet.

4. The information processing apparatus of claim 2, wherein the image information of the first image data further includes image identification information used for identifying a type of the original image data, wherein the processing circuitry is configured to,
 determine the ratio of the vertical length and the horizontal length of at least one of the photo data and the sheet based on the image identification information, and
 predict the size of the storage-use region based on the ratio.

5. The information processing apparatus of claim 1, wherein the processing circuitry is configured to,
 analyze whether the first image data and the second image data have continuity based on the image information of the first image data and image information of the second image data, when the processing circuitry stores the first image data in the memory and then acquires the second image data,
 determine to merge the second image data with the first image data already stored in the memory, when the processing circuitry analyzes that the first image data and the second image data have the continuity, and
 predict the size of the storage-use region in the memory to be used to store the first image data and the second image data based on the image information of the first image data and the image information of the second image data.

6. The information processing apparatus of claim 1, wherein the processing circuitry is configured to,
 generate a command for causing an image forming apparatus to execute an image forming operation based on the merged plurality of image data stored in the storage-use region in the memory, and
 transmit the generated command to the image forming apparatus.

7. The information processing apparatus of claim 6, wherein the processing circuitry is configured to,
 clear the storage-use region secured in the memory to re-use the memory to merge another image data, when the processing circuitry transmits the generated command to the image forming apparatus.

8. A method of merging image data comprising:
 acquiring a plurality of images divided from original image data, the plurality of images including at least a first image data and a second image data;
 predicting a size of a storage-use region in the memory based on image information of the acquired first image data prior to obtaining image information of all of the plurality of images associated with the original image such that the size accommodates the plurality of images associated with the original image, the storage-use area configured to store the plurality of image data;
 securing the predicted size of the storage-use region in the memory such that the storage-use region includes adjacent locations in the memory;
 merging the plurality of image data in the storage-use region secured in the memory based on image information of the acquired first image data; and
 storing the merged plurality of image data in the storage-use region secured in the memory.

9. The method of claim 8, wherein the image information of the first image data includes information of a vertical length and a horizontal length related to the original image data, the original image data being at least one of a photo data captured by using an image capture and an image data on a sheet, and the predicting comprises:
 predicting the size of the storage-use region based on a ratio of the vertical length and the horizontal length of at least one of the photo data and the sheet.

10. The method of claim 9, further comprising:
 setting the ratio of the vertical length and the horizontal length of the sheet based on a size of the sheet.

11. The method of claim 9, wherein the image information of the first image data further includes image identification information used for identifying a type of the original image data, and the method further comprises:
 determining the ratio of the vertical length and the horizontal length of at least one of the photo data and the sheet based on the image identification information, wherein
  the predicting predicts the size of the storage-use region based on the determined ratio of the vertical length and the horizontal length of at least one of the photo data and the sheet.

12. The method of claim 8, further comprising:
 analyzing whether the first image data and the second image data have continuity based on the image information of the first image data and image information of the second image data, when the first image data is stored in the memory and then the second image data is acquired; and
 determining to merge the second image data with the first image data already stored in the memory when the first image data and the second image data had the continuity, wherein
  the predicting predicts the size of the storage-use region in the memory to be used to store the first image data and the second image data based on the image information of the first image data and the image information of the second image data.

13. The method of claim 8 further comprising:
 generating a command for causing an image forming apparatus to execute an image forming operation based on the merged plurality of image data stored in the storage-use region secured in the memory; and
 transmitting the generated command to the image forming apparatus.

14. An image processing system comprising:
 the information processing apparatus of claim 1; and
 an image forming apparatus configured to,
  receive a command from the information processing apparatus, and
  perform an image forming operation based on the received command.

15. A non-transitory computer readable storage medium storing a program that, when executed by a computer, causes the computer to,
 acquire a plurality of images divided from original image data, the plurality of images including at least a first image data and a second image data;
 predict a size of a storage-use region in the memory based on linage information of the acquired first image data prior to obtaining image information of all of the plurality of images associated with the original image such that the size accommodates the plurality of images associated with the original image, the storage-use area configured to store the plurality of image data;
 secure the predicted size of the storage-use region in the memory such that the storage-use region includes adjacent locations in the memory;

merge the plurality of image data in the storage-use region secured in the memory based on image information of the acquired first image data; and store the merged plurality of image data in the storage-use region secured in the memory.

16. The non-transitory computer readable storage medium of claim 15, wherein the image information of the first image data includes information of a vertical length and a horizontal length related to the original image data, the original image data being at least one of a photo data captured by using an image capture and an image data on a sheet, and the program, when executed by the computer, causes the computer to predict the size of the storage-use region based on a ratio of the vertical length and the horizontal length of at least one of the photo data and the sheet.

17. The non-transitory computer readable storage medium of claim 15, wherein the program, when executed by the computer, causes the computer to, analyze whether the first image data and the second image data have continuity based on the image information of the first image data and image information of the second image data, when the first image data is stored in the memory and then the second image data is acquired;

determine to merge the second image data with the first image data already stored in the memory when the first image data and the second image data have the continuity; and predict the size of the storage-use region in the memory to be used to store the first image data and the second image data based on the image information of the first image data and the image information of the second image data.

* * * * *